Figure 1:
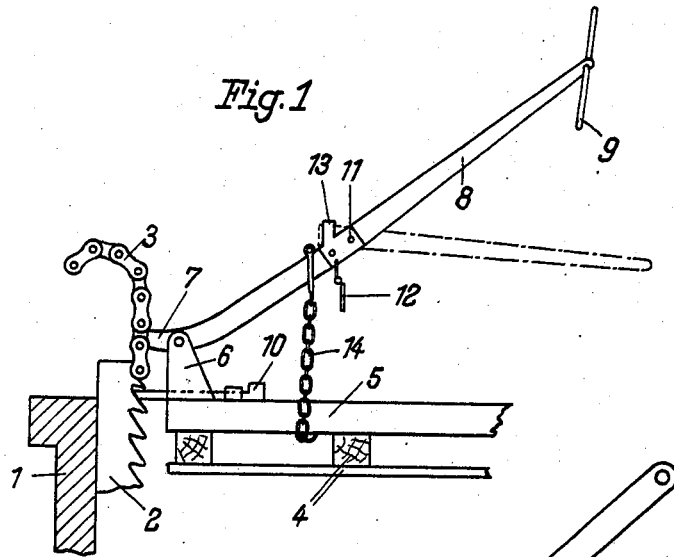

June 20, 1939.   F. SCHMIDT   2,162,922
PROCESS FOR SILOING GREEN FODDER
Filed Dec. 9, 1936   3 Sheets-Sheet 1

Ferdinand Schmidt
Inventor:
By [signature]
his Atty.

June 20, 1939.  F. SCHMIDT  2,162,922
PROCESS FOR SILOING GREEN FODDER
Filed Dec. 9, 1936  3 Sheets-Sheet 2
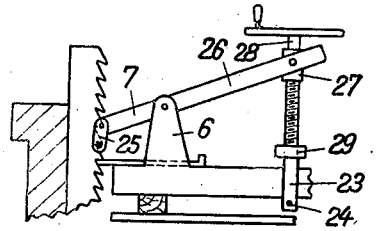
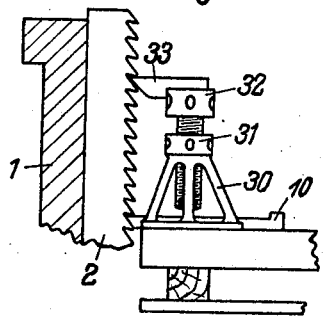
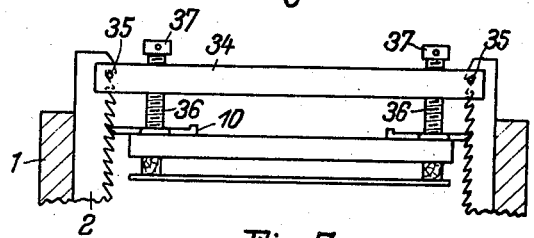
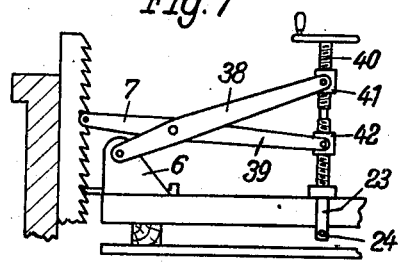
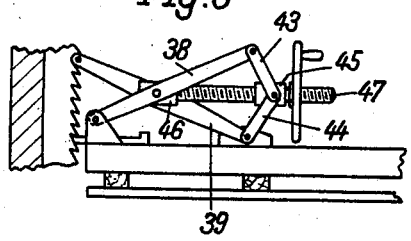
Ferdinand Schmidt
*Inventor:*

June 20, 1939.                F. SCHMIDT                    2,162,922
                       PROCESS FOR SILOING GREEN FODDER
                       Filed Dec. 9, 1936         3 Sheets-Sheet 3
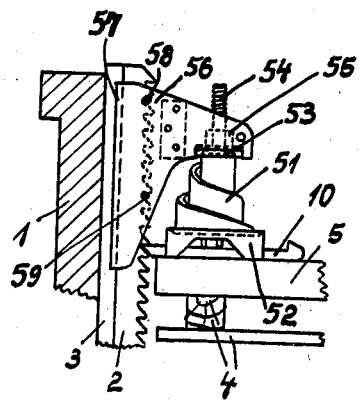
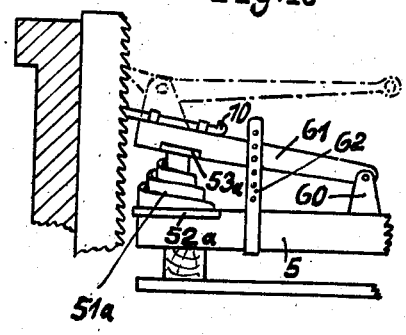
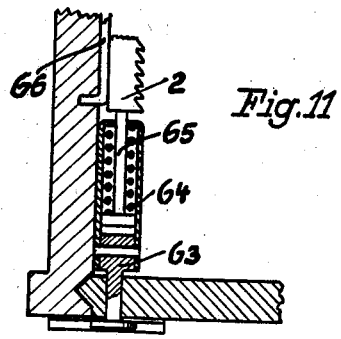
Ferdinand Schmidt
Inventor:

Patented June 20, 1939

2,162,922

UNITED STATES PATENT OFFICE 2,162,922

PROCESS FOR SILOING GREEN FODDER

Ferdinand Schmidt, Verden-on-the-Aller, Germany

Application December 9, 1936, Serial No. 114,945
In Germany December 17, 1935

2 Claims. (Cl. 99—8)

In the siloing of green fodder and, in case of need, also potatoes, the main methods are characterised, on the one hand, by the use of acid, or, on the other hand, by the use of sugar, and even a combination of the two single processes has been proved to be quite particularly favourable. Nevertheless, constant efforts are made to obtain a further cheapening, where possible by the omission of any addition, but, in particular, by the omission of the addition of acid which is of no use for the body building of animals. These efforts have led, however, to many failures, even when an undesirably large admission of air is prevented by cutting and compressing the fodder.

The invention consists in producing by very great pressing of the mass of fodder in the silo, a large outflow of sap right from the start in such a way that either this sap alone or, in the case of fodder which is very poor in sap, the expressed sap together with some liquid addition, forms a liquid coating completely covering the mass of fodder. An addition of acid either does not come into question at all, in particular when the green fodder is already somewhat dried, or small quantities or acid (up to about pH 5 or at the most pH 4.5) are added in order quickly to break down quite fresh fodder and thereby make it more easily pressable. Sugar, or sugar carriers, such as molasses and similar materials, or even acid-containing wood sugars, can on the other hand be added up to larger quantitative proportions because these materials greatly promote the desired formation of lactic acid and also are directly good for the animal.

The pressure in the silo is selected to be larger or smaller according to the freshness of the fodder and, on the other hand, to the extent of a softening addition of hydrochloric acid. Even with still fresh fodder a pressure up to about 0.15 kg./cm.$^2$ has been found to be favourable; in special cases a pressure up to 0.3 kg./cm.$^2$ is used.

The success of this new process with its different possibilities consists in the siloing at low original cost (in consequence of almost complete saving of acid and partial saving of sugar) but with a quite particularly good fodder, because this latter contains no superfluous quantities of mineral acid, which at the utmost are harmful to the animal, but is obtained exclusively by lactice acid which suits the animals excellently. Failures, in spite of the simplification and cheapening, are practically excluded with the new process.

A valuable detail of the process consists in adding cultures of special fermenting bacteria, chiefly of anaerobic kind, which can be added in the most simple way with acid or sugar solution or other addition liquid. In view of the unusually reliable exclusion of air of the new process such bacteria find themselves present in unusually good living conditions, so that they multiply quickly and produce products similar to lactic acid, which quickly and fundamentally oppose the formation of butyric acid and acetic acid in the fodder.

It is important for carrying out the new process to provide the silo with an unusually powerful pressing apparatus, which, however, must be capable of manipulation by simple hand operation in the, generally, narrow head space of the silo. A number of such pressing devices are later described in detail.

The invention may further consist in providing a specially strong spring, suitable for a lasting silo pressing, which is extensible and contractible by means of parts constrained to move together. Contrary to the case where loose insertions are present, the spring is controlled in every condition of straining so absolutely certainly that, even by sliding off or fracture of any one auxiliary member, a sudden bursting away of the spring cannot take place. Thus an elastic pressure having quite unusually high pressures is obtainable.

A valuable constructional form is obtained by constructing a spring, separately compressible for itself by means of a screw spindle, between pressure plates, and inserting it between the press cheek and the ratchet rod or its substitute member. The compulsorily compressed spring is completely harmless, until specially inserted between the already depressed press cheek and the ratchet rod, and is then brought on load by releasing its spindle, and in the permanent condition thus introduced there is no longer any danger of fracture or sliding off of parts. A bracket can be used for transmitting the spring pressure to the ratchet rod, which suitably engages in grooves on the ratchet rod and can be fixed at a desired height with pins.

Another valuable constructional form is obtained if a more powerful lever is mounted on the press cheek and carries the bolt usually seating on the press cheek and the press lever and is duly pressed upwards from the press cheek by the spring. Here again by the rigid guiding of the spring lever accidents are well prevented even with very powerful pressure. In particular a holding device can hold the spring lever in the most different positions on the press cheek, always with a short travel, the holding device being constructed as a locking ratchet rod or an apertured rod and being released only after the full completion of the pressing operation.

Finally, a quite particularly reliable and safe construction is obtained if the spring is so connected that it loads the whole drive downwards, for example by connecting it between the bottom end of the ratchet rod or its substitute member and the anchoring means for this member. In this case any fracture or sliding off of parts in the driving gear produces nothing else than a harmless downward acceleration of the ratchet rod in the silo, and a fracture below, adjacent to the anchoring means, can, on account of the small mass which would be released, produce nothing else than quite a slight upward blow in the ratchet rod.

The spring can in all cases be replaced by air buffers or other similarly acting members, and in certain circumstances also by weights.

The drawings illustrate a number of constructional examples of pressing devices according to the invention.

Figure 2:
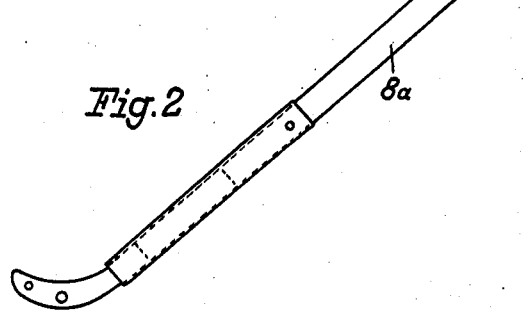
Figure 3:
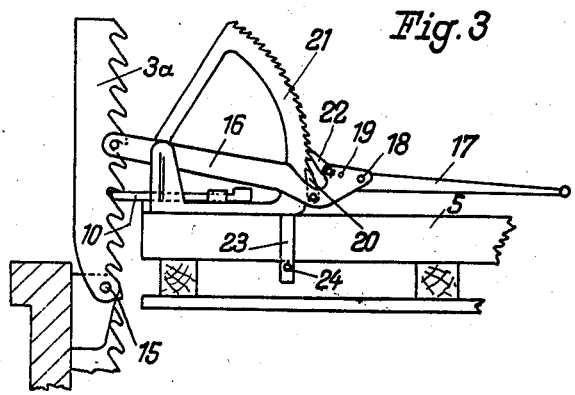

Fig. 1 illustrates a lever press having angular adjustability between the load arm and the hand arm;

Fig. 2 a pressure lever of extensible kind;

Fig. 3 a hand lever press with ratchet gear;

Fig. 4 a spindle operated lever press;

Fig. 5 a jack press;

Fig. 6 a double spindle press;

Fig. 7 a lever shears press with vertical spindle;

Fig. 8 a lever shears press with horizontal spindle and toggle lever action;

Fig. 9 a spring member capable of being separately strained and of being built into the silo standing under pressure;

Fig. 10 is a spring loaded lever built rigidly on the press cheek;

Fig. 11 a spring member built in between ratchet rod and the anchoring means.

According to Fig. 1 ratchet rods 2 are built into the silo container 1 on two oppositely disposed wall parts which are extended at top above the edge of the silo in the form of sprocket chains 3. A press cover 4 is depressible by a press cheek 5, whilst a block 6 which can be intermittently placed on its ends engages with load arm 7 in the ratchet rod 2, 3, and is depressible at its long hand lever arm 8, a handle 9 permitting operation by a number of people. A bolt 10 which is displaceable on the press cheek 5 holds the press cheek fast during the further gripping with the hand lever 7, 8. The hand lever arm 8 is, in order to be angularly adjustable relatively to the load arm, collapsible around a pivot 11 and can be fixed by a pin 12 in a straight line position or can be held (as illustrated in dot and dash lines) in a depressed position by a stop 13. In this way the lever arm can always be brought into an approximately horizontal position, and thereby the operators can act with the whole weight of their bodies on the lever, the big leverage of which produces in this way an extremely high pressure in the silo. A chain 14 which, in a half depressed position of the lever can be hooked up below the press cheek 5 holds the lever rigid, whilst by straightening and introducing the pin, the hand lever is again adjusted in a favourable position for the completion of the lever movement corresponding to one ratchet rod tooth.

According to Fig. 2 the arrangement is fundamentally similar to the foregoing except that the outer hand lever part 8a is here mounted so as to be longitudinally displaceable on the other part, which permits, with a steep lever position, of shortening the lever in order to enable it to be brought into the silo space and to make it more favourable for gripping, whilst on the downward stroke the lever can be extended in order to exert a particularly powerful increasing pressure. The holding chain of the preceding constructional example can here be dispensed with in certain circumstances, namely, when the outer lever part 8a is mounted so as to be easily slidable inside the inner lever part and drawn out during the pressure stroke.

According to Fig. 3 the parts 1 to 7 are fundamentally the same as in the first example, but here the top part 3a of the ratchet rod, constructed as a ratchet rod with undercut teeth, is attached with a single pivot 15; in this way the necessary flexibility is obtained relatively to the transverse pressures exerted by the engaging arm 7 and sliding out of the teeth is at the same time prevented, just as with the sprocket chain or with a pin toothed rod. A hand lever 16, 17 here serves for driving the engaging arm 7. It is collapsible around a pivot 18 and can be stiffened with a pin 19 when it is to serve directly as the driving lever. If on the other hand an increased leverage is to be provided, this is obtainable by drawing out the pin 19, the inner lever 16 locked by a locking pawl 20 to a toothed sector 21 being moved along the saw-tooth sector 21 by a to and fro movement of the hand lever 17 by means of an engaging pawl 22 secured to the lever 16. In order in spite of its detachability to be able to transmit the very high traverse gear forces to the press cheek 5, the toothed sector 21 extends with forked arms 23 below the press cheek and there receives a pin which can be passed through below the press cheek.

According to Fig. 4 the engaging arm 7 is provided with a hanging pawl 25 in order to permit the pawl accurately to follow the ratchet rod without longitudinal displacement of its block 6 on the press cheek 5. A hand wheel spindle 28, the point of which runs in a bearing 29, running in a tiltable nut 27 of the lever, here serves for depressing the power arm 26. It can be secured rigidly to the press cheek 5 by the forked ends 23 and a pin 24 as in the previous examples.

According to Fig. 5 a spindle jack 30 which has a hook spanner nut 31 for upward adjustment is fitted at its adjusting head 32 with a tooth 33 which is directly engageable in the ratchet rod, the whole jack resting on the press cheek. The press cheek here carries singly as an adjoining part the bolt 10, which prevents return movement, as in the previous examples. Known hydraulic lifting devices are also applicable in the same way.

A press constructed with a bridge cheek 34 particularly suitable for high tower-like silos having small diameter is shown in Fig. 6. The cheek 34 can be secured by pins 35 to the ratchet rods and contains two spindles which are provided with hook spanner heads 37. This apparatus permits of particularly rapid and effective depression over great heights.

According to Fig. 7 the engaging arm 7 is not directly mounted on the block 6 but on a lever shear 38, and together with it and the power arm 39 forms a shears. The two shear arms can be drawn apart by a hand wheel spindle 40 which again can be clamped to the press cheek 5 with a bearing 29 at its point, by a fork piece 23 and a pin 24; the hand wheel spindle has two opposite threads in screw nuts 41, 42 of the lever shears 38, 39. With this construction it is possible to give to the head of the engaging lever 7 an accurately perpendicular movement.

According to Fig. 8 the lever shears 38, 39 are connected by a pair of toggle levers 43, 44 and the common pivotal point 45 of the toggle lever is connected with the pivotal point 46 of the shears by a hand wheel spindle 47. Extremely high pressures for silos of large diameter can here be produced by closing the toggle levers 43, 44.

Fundamentally, the fixed ratchet rods can in all cases be replaced by sprocket chains, ordinary chains or even wire ropes. In the case of chains or ropes, instead of engaging levers or pawls, chain wheels or winding drums can suitably be provided, which then, on their side, are driven by worm gearing or lever gear in the sense of the constructional forms illustrated.

Where quite particularly bulky fodder is to be treated the cutting normally necessary for most kinds of fodder can to a certain extent facilitate the work of the press.

According to Fig. 9 a spring member serves for retaining the pressure. A very strong spring 51, in the manner of railway buffer springs, can be compressed between two pressure plates 52, 53 by means of a screw spindle 54 and nut 55 moving thereon, so that by inserting this member between the press cheek 5 and the ratchet rod 2, after the release of the straining nut 55 by means of a box spanner, the spring gradually further compresses the mass of fodder. The lower pressure plate 52 fits on to the press cheek 5 and the upper pressure plate 53 fits into a bracket 56 which engages with its flanges 57 the wider ratchet part 2 so that it cannot slide off. A pin 58 can be passed through the bracket and suitable apertures in the ratchet rod in order to secure the bracket 56 at any desired height; a second pin 59 can serve as a safety device in case of fracture of the first pin. The bolt 10 can be pushed back before the release of the nut 55, but in the saw-tooth form illustrated of the ratchet rod it is also released as soon as the nut 55 is released.

This arrangement permits of automatically further compressing the fodder overnight by 30 to 40 cms., for example with a maximum pressure of 12,000 kg. at each end of the press cheek, thereby greatly accelerating the whole pressing operation and providing a much improved preservation.

According to Fig. 10 a spring lever 61 is mounted on a press cheek 5 in a block 60. The spring lever 61 is pressed upwards from the press cheek by the intermediately located spring 51a with its pressure plates 52a, 53a, and itself carries the bolt 10 usually disposed on the press cheek, as also the pressing lever (illustrated in dot and dash lines) with its bearing shoe. A spring holding device 62 having a number of apertures extends around the press cheek 5 and the spring lever 61 and holds the latter with a short travel in each pressing position by suitable insertion of a pin, so that even if the pressing lever and bolt slide off no harm can arise. After the depression is over the pin is removed and the spring is free to execute its gradual pressing expansion.

According to Fig. 11, a spring 51b is inserted between the ratchet rod 2 and its anchoring foot 63, embedded in concrete at the bottom of the silo, a sleeve 64 being bolted on to the anchor 63 and a tension rod 65 extending from the ratchet rod 2 through the spring. A metal lining 66 protects the wall of the silo from damage by the ratchet rod which here slides on and off it. The sleeve 64 can be guided in a liquid-tight manner on the draw bolt 65 in order to protect the spring from the silo acid, but even without such protection corrosion, with a suitable steel, remains insignificant for years.

I claim:

1. The process for siloing fodder which consists in subjecting the fodder within the silo to a mechanical pressure of at least 0.15 kg./cm.$^2$ over atmospheric pressure, to produce an overflow of sap sufficient to cover said fodder, and keeping the fodder covered with said sap.

2. The process according to claim 1, in which a substance selected from the group consisting of solid and liquid sugar and sugar-containing substances is admixed with the fodder before subjecting the same to pressure, and in which is admixed only the amount of acid required to adjust the pH value to between 4.5 and 5.

FERDINAND SCHMIDT.